United States Patent [19]
Black, Jr.

[11] Patent Number: 5,634,319
[45] Date of Patent: *Jun. 3, 1997

[54] TRUSS PLATE BUNDLE IDENTIFICATION SYSTEM

[75] Inventor: William H. Black, Jr., Edenton, N.C.

[73] Assignee: Tee-Lok Corporation, Edenton, N.C.

[*] Notice: The term of this patent shall not extend beyond the expiration date of Pat. No. 5,392,908.

[21] Appl. No.: 411,082

[22] Filed: Mar. 27, 1995

[51] Int. Cl.$^6$ .................................. B05B 13/02
[52] U.S. Cl. ...................... 53/399; 53/131.2; 283/79; 206/459.5
[58] Field of Search ................... 53/399, 131.2, 53/131.3, 131.4, 131.5; 206/459.5; 283/55, 79, 114

[56] References Cited

U.S. PATENT DOCUMENTS

| | | | |
|---|---|---|---|
| 2,271,632 | 2/1942 | Diehl | 93/93 |
| 2,996,721 | 8/1961 | Black | 1/149 |
| 3,100,301 | 8/1963 | Black | 1/60 |
| 3,337,905 | 8/1967 | McAlpine | 85/13 |
| 3,416,283 | 12/1968 | Sanford | 52/693 |
| 3,473,362 | 10/1969 | Black et al. | 72/326 |
| 3,498,170 | 3/1970 | Sanford | 85/13 |
| 3,526,773 | 9/1970 | Davis | 53/131.4 |
| 3,880,286 | 4/1975 | Wegener | 206/386 |
| 3,963,452 | 6/1976 | Jureit et al. | 29/193.5 |
| 4,225,095 | 9/1980 | Jureit et al. | 242/1 |
| 4,251,168 | 2/1981 | Groetschel | 405/288 |
| 4,427,145 | 1/1984 | Harris | 225/97 |
| 4,936,170 | 6/1990 | Zumeta | 206/459.5 |
| 4,965,740 | 10/1990 | Schofield et al. | 364/512 |
| 5,026,084 | 6/1991 | Pasfield | 283/114 |
| 5,218,813 | 6/1993 | Seidel | 53/399 |
| 5,265,722 | 11/1993 | Schmidmeister | 206/321 |
| 5,330,230 | 7/1994 | Craig | 283/55 |
| 5,392,908 | 2/1995 | Black, Jr. | 206/321 |
| 5,395,137 | 3/1995 | Kim | 283/114 |
| 5,445,272 | 8/1995 | Crisp | 206/459.5 |

OTHER PUBLICATIONS

Affidavit of Donald J. Bender dated 27 Apr. 1995.
Affidavit of Todd L. Robinson dated 2 May 1995.
Tee-Lok, Inc.; Truss Plate Package Photos (Photos 1-5).
*Finland's Makron Company Is A Master Machinery Producer; Automated Builder;* pp. 1, 4, 14 and 15; (Oct. 1992).
Brochure of *Makron Truss Plate Line TPL 50-8.*
Video regarding Truss Plate Packaging System.

*Primary Examiner*—John Sipos
*Assistant Examiner*—Gene L. Kim
*Attorney, Agent, or Firm*—Bell, Seltzer, Park & Gibson, P.A.

[57] ABSTRACT

A system for identifying bundled truss plates is disclosed. The truss plate bundles include visual indicia that indicate the thickness and material composition of the material from which the truss plates are constructed. Methods for packaging such truss plate bundles and constructing trusses with truss plates from such bundles are also disclosed.

6 Claims, 4 Drawing Sheets

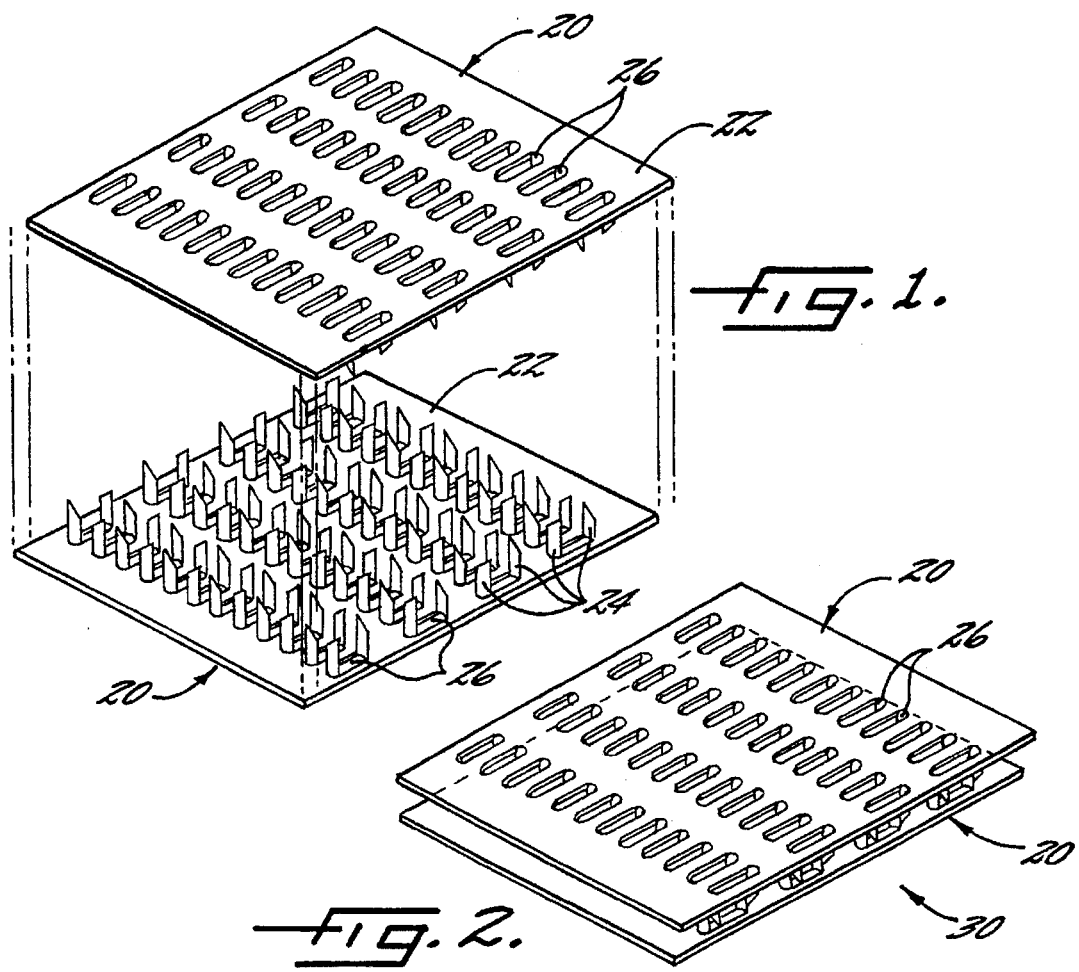
Fig. 1.
Fig. 2.
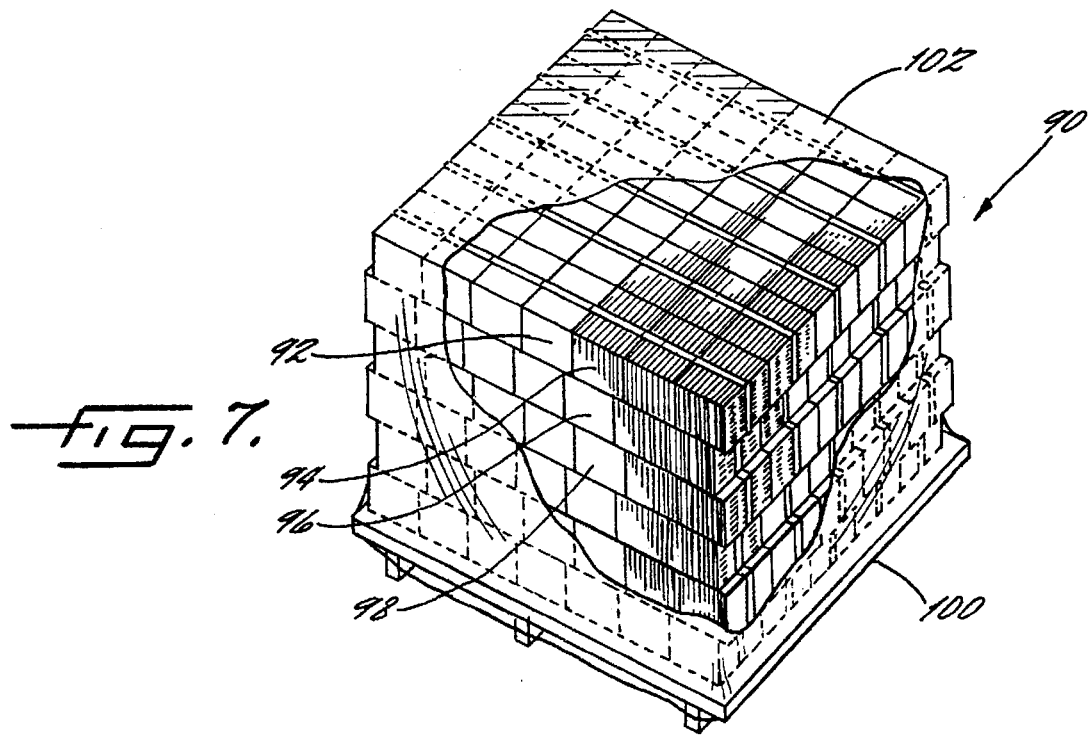
Fig. 7.

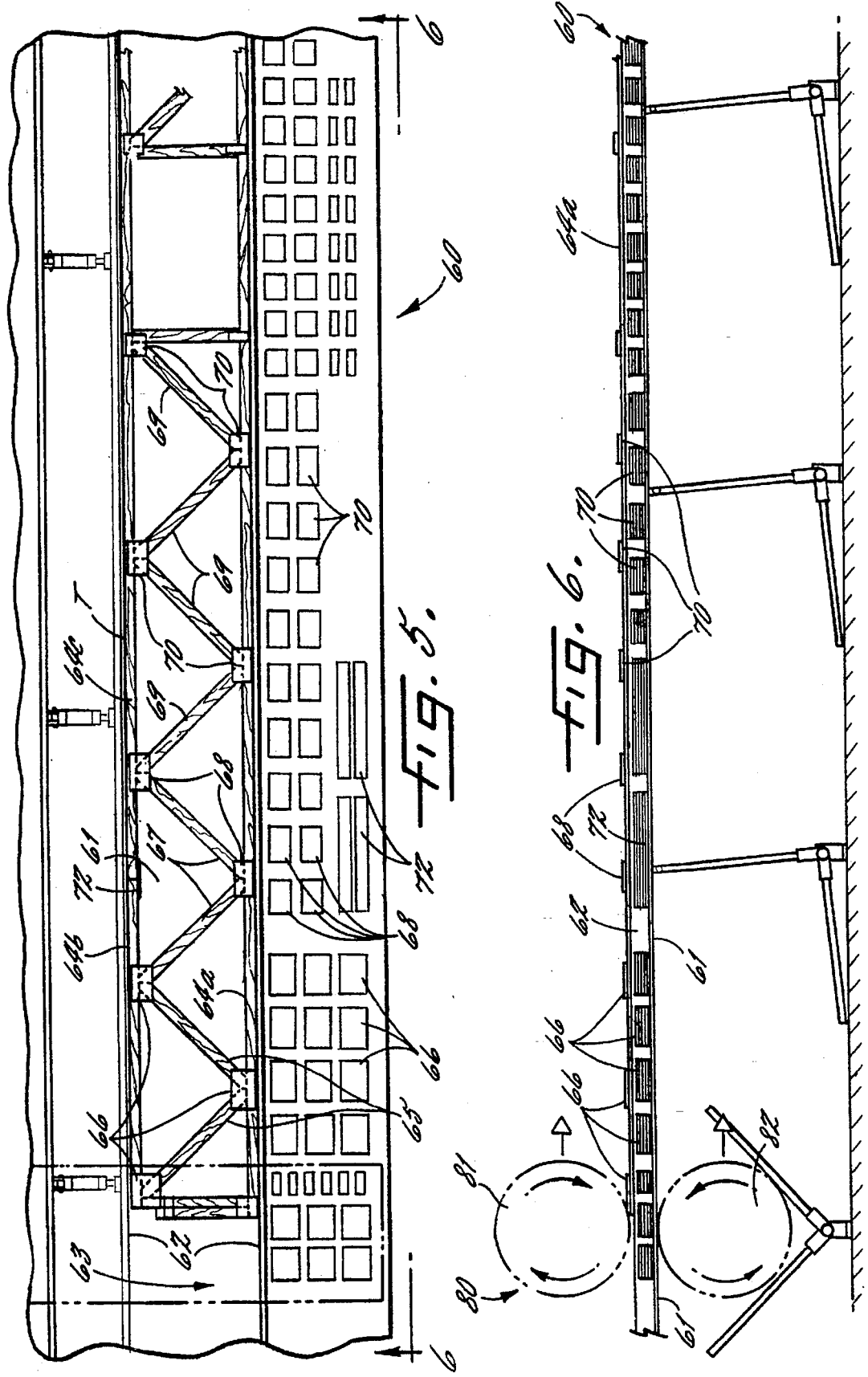

TRUSS PLATE BUNDLE IDENTIFICATION SYSTEM

FIELD OF THE INVENTION

The invention relates generally to the construction of trusses, and more particularly relates to the packaging of truss plates used in the construction of trusses.

BACKGROUND OF THE INVENTION

Truss plates are generally employed to join planks of lumber that form floor and roof trusses used in residential housing. Truss plates typically comprise a backing plate and an array of sharp spike-like impaling members that extend outwardly from the backing plate. Adjacent planks of a truss with coplanar surfaces can be permanently joined by pounding or pressing the backing member of a truss plate so that its impaling members penetrate the planks.

Truss plates have traditionally been packaged in boxes or cartons in no particular order whatsoever; they are simply strewn haphazardly within their container. If the container is emptied or if it is somehow removed or destroyed, the truss plates spill and spread and can be quite hazardous until they are retrieved and restored. As a result, truss plates generally have been stored on-site in their packaging cartons until use.

U.S. Pat. No. 5,392,908 to Black describes a truss plate packaging method and configuration in which truss plates are packaged in unitized bundles. The truss plates are arranged so that their respective backing members are substantially parallel, with the peripheries of the backing members being substantially aligned. The truss plates are then interconnected with some interconnecting means, such as a strap that snugly wraps around the truss plates, to form a unitized bundle. Such a bundle can be conveniently shipped, stored, and handled in the manufacture of trusses.

A problem faced by truss construction firms involves the identification of truss plates. Generally, truss plates are stamped from sheet steel; commonly, the steel is 20 gauge (about 0.036 inches), 18 gauge (about 0.048 inches), or 16 gauge (about 0.060 inches) in thickness. In addition, truss plates can be formed from many different steel types; commonly, truss plates are formed of either 33 ksi (kilopounds per square inch) yield strength steel, as specified by ASTM standard A446, or from so-called "high yield" steel, which has a higher yield strength of about 60 ksi. Proper identification of truss plate thickness and material type can be critical for the construction of some trusses, such as floor trusses, as some construction codes or engineering specifications may require that certain joints be connected with truss plates of a specified minimum thickness or material composition. However, the differences in thickness or material composition between truss plates can be difficult to discern visually, particularly for unskilled or inexperienced operators. Some operators can experience extreme difficulty in distinguishing truss plate thickness or material compositions at a distance, particularly if the truss plates are packaged in truss plate bundles as described above. Some truss plate manufacturers imprint the thickness of the truss plate on the backing member to assist with identification. Nonetheless, there exists no effective method for operators to discern truss plate thickness or material type at a distance.

In view of the foregoing, it is an object of the present invention to provide a packaging method and an associated package that enables an operator to instantly recognize the thickness and material composition of the truss plate contained within the package.

It is also an object of the present invention to provide a method of manufacturing such a package.

SUMMARY OF THE INVENTION

These and other objects are satisfied by the present invention, which as a first aspect provides a method of interconnecting wooden planks with truss plates to form a truss, wherein each of the truss plates comprises a generally planar backing member and a plurality of impaling members extending outwardly from one side thereof. The truss plates are provided in first and second truss plate bundles. The first truss plate bundle comprises a first plurality of truss plates, wherein the backing members of each have a first thickness and a first material composition, and wherein the first plurality of truss plates is arranged so that so that the backing members of the first plurality of truss plates are disposed generally parallel to one another, and each truss plate of the first plurality of truss plates is in contacting relationship with at least one other truss plate. The first truss plate bundle further comprises first connecting means cooperating with the first plurality of truss plates for effecting unitization thereof. The first connecting means includes first visual indicia indicating that the first truss plate bundle comprises truss plates with backing members of the first thickness and the first material composition. The second truss plate bundle comprises a second plurality of truss plates, wherein the backing members of each have a second thickness and a second material composition. At least one of the second thickness and the second material composition are different from, respectively, the first thickness and the first material composition. The second plurality of truss plates are arranged so that so that the backing members are disposed generally parallel to one another and so that each truss plate of the second plurality of truss plates is in contacting relationship with at least one other truss plate of the second plurality of truss plates. The second truss plate bundle further comprises second connecting means cooperating with the second plurality of truss plates for effecting unitization thereof. The second connecting means includes second visual indicia that indicates that the second truss plate bundle comprises truss plates with backing members of the second thickness and the second material composition. The second visual indicia is different than the first visual indicia. The method comprises the steps of: providing a first pair of wooden planks; identifying the first truss plate bundle; interconnecting the first pair of wooden planks with one of the first plurality of truss plates; providing a second pair of wooden planks; identifying the second truss plate bundle; and interconnecting the second pair of wooden planks with one of the second plurality of truss plates.

Preferably, the first and second connecting means comprise first and second connecting bands, and wherein the first and second connecting bands are formed in different colors. Using different colored bands enables the thickness and material composition of the truss plates comprising the first and second truss plate bundles to be identified rapidly, even at a distance.

A second aspect of the present invention is a method of packaging truss plates of the configuration described above. The method comprises the steps of: wrapping a first plurality of truss plates with a first connecting band to create a first unitized truss plate bundle and wrapping a second plurality of truss plates with a second connecting band to create a second unitized truss plate bundle. The backing members of the first plurality of truss plates have a first thickness and a first material composition. The first connecting band includes first visual indicia indicating that the first truss plate bundle comprises truss plates with backing members of the first thickness and the first material composition. The backing members of the second plurality of truss plates have a second thickness and a second material composition, at least one of which differs from the first thickness and the first material composition. The second connecting band includes second visual indicia indicating that the second truss plate bundle comprises truss plates with the second thickness and second material composition. Preferably, the method further comprises the step of shipping the first and second bundles to a remote location.

BRIEF DESCRIPTION OF THE DRAWINGS

FIG. 1 is a perspective view of a pair of truss plates.

FIG. 2 is a perspective view of the pair of truss plates of FIG. 1 formed into a cooperating pair.

FIG. 5 is a plan view of a truss table illustrating the layout of wooden planks arranged into a triangulated truss configuration and further illustrating the positioning of truss plates interconnecting the planks and on the edge of the truss table.

FIG. 6 is a side view of the truss table of FIG. 4.

FIG. 7 is a perspective view of a package of truss plate bundles of the present invention.

DETAILED DESCRIPTION OF THE INVENTION

Figure 3A:
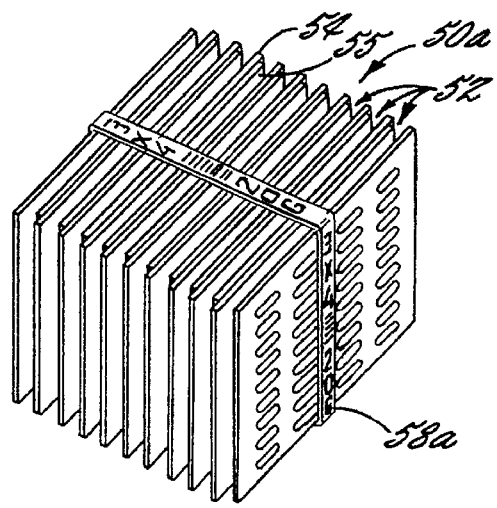
FIGS. 3A through 3D are perspective views of truss plate bundles of the present invention. The truss plate bundle of FIG. 3A includes a connecting band that is shaded to indicate that it is white, the truss plate bundle of FIG. 3B includes a connecting band that is shaded to indicate that it is red, the truss plate bundle of FIG. 3C includes a connecting band that is shaded to indicate that it is black, and the truss plate bundle of FIG. 3D includes a connecting band that is shaded to indicate that it is yellow.
Figure 3B:
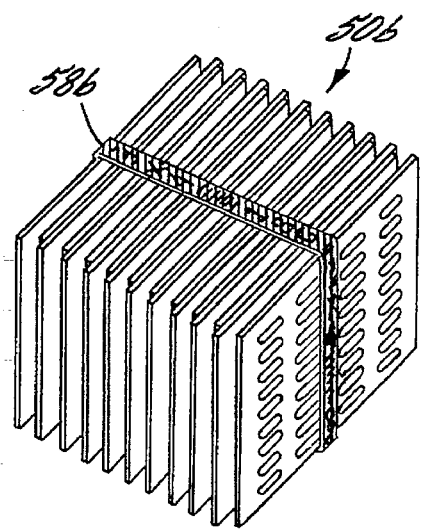
Figure 3C:
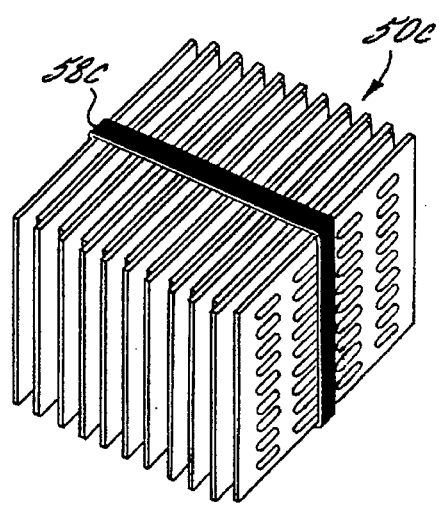
Figure 3D:
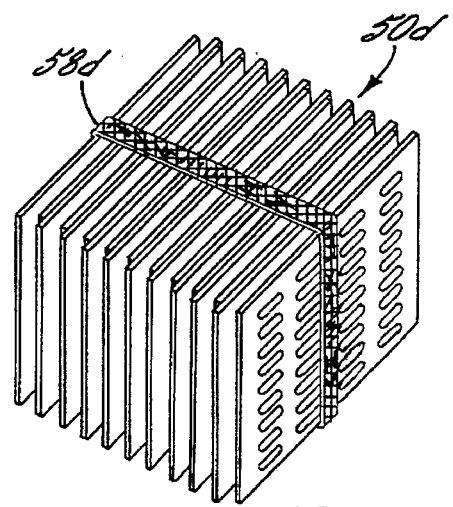

The present invention will be described more particularly more hereinafter with reference to the accompanying drawings. The invention is not intended to be limited to the illustrated and disclosed embodiments; rather, these embodiments are intended to fully and completely disclose the invention to those skilled in this art.

Referring now to the drawings, a pair of substantially identical truss plates 20 are shown in FIGS. 1 and 2. Each of these truss plates 20 comprises a generally planar backing member 22 and a plurality of impaling members 24. The impaling members 24 extend outwardly from one side of the backing member 22. In the truss plate embodiment illustrated in FIGS. 1 and 2, individual impaling members 24 are arranged in pairs formed by striking out a portion of the backing member 22 with a punch of oblong cross-section; the impaling members 24 formed thereby extend from the backing member 22 at the longitudinal edges of an elongated aperture 26 formed by the punch. Struck-out impaling members 24 are preferred, as they have a slightly arcuate cross-section as a consequence of the striking process that renders the impaling members 24 more resistant to bending during penetration into a plank. Those skilled in this art will appreciate that the impaling members of the truss plates can be formed by other techniques, such as roll-forming, and still be suitable for use with this invention.

The illustrated rectangular shape of the backing member 22 is preferred; common rectangular backing member sizes include backing members that measure 3 inches in width by 4 inches in length and those that measure 5 inches in width by 6, 7, or 8 inches in length, but backing members 22 may be as large as 20 inches in length and width or even larger, or 1 or 2 inches in length and width or even smaller. It should be understood that the backing member 22 can take other forms, such as those in which the corners of a rectangular backing member are rounded or beveled, are also suitable for use with the present invention.

In the embodiment illustrated in FIGS. 1 and 2, the impaling members 24 and the apertures 26 are positioned on the backing member 22 in a plurality of parallel rows; however, the impaling members 24 and apertures 26 can be positioned on the backing member 22 in other arrangements. In one such alternative truss plate configuration, the impaling members and apertures are arranged so that adjacent impaling members and apertures are alternately staggered relative to one another. Truss plates of this configuration are illustrated in U.S. Pat. No. 5,392,908 to Black, the disclosure of which is hereby incorporated herein in its entirety. Unless otherwise stated, those skilled in this art will appreciate that the ensuing discussion is equally applicable to truss plates having "in-line" impaling members, such as that illustrated in FIGS. 1 and 2, staggered impaling members, and other configurations.

Illustratively the impaling members 24 are approximately 0.125 inches in width and are spaced apart approximately 0.125 inches from adjacent impaling members in the same row on the backing member 22. The impaling members 24 in adjacent rows are spaced apart approximately 0.5 inches. Typically, the impaling members 24 extend from the backing member 22 between about 0.2 and 0.5 inches. If the impaling members 24 are formed by striking out the backing member 22, the impaling members 24 will be approximately equal in thickness to the backing member 22. Those skilled in this art will appreciate that, although the aforementioned dimensions are preferred, truss plates suitable for use with the present invention can take a wide variety of dimensions.

The truss plates 20 are typically formed from 20 gauge, 18 gauge, or 16 gauge steel, although other steel thicknesses are also suitable for use in truss plates. The truss plates are typically formed of steel having a yield strength of about 33 ksi, but can also be formed from so-called "high-yield" steel, which has a yield strength of about 60 ksi. The thickness and material type of a particular truss plate determine its performance characteristics, which in turn determine which joints of a truss the truss plate can be used to interconnect.

FIG. 2 illustrates a cooperating pair 30, or couplet, of truss plates 20, which is formed by positioning two truss plates so that their respective backing members 22 are disposed in parallel overlying relationship, with the impaling members 24 of each truss plate 20 extending toward the backing member 22 of the other truss plate. In such an arrangement, the positional relationship of the impaling members restricts the movement of truss plates comprising the pair relative to one another in a plane parallel to that of their respective backing members. In particular, impaling members 24 of slightly arcuate cross-section, such as those that have been formed by striking out a portion of a backing member 22, are effective in restricting lateral movement (i.e., movement in a direction perpendicular to the longitudinal axes of apertures 26), as the arcuate portions of contacting impaling members 24 tend to nest. The truss plates 20 comprising the cooperating pair 30 can be separated by lifting the backing member of one truss plate away from the backing member of the other truss plate, as such separatory movement in this direction is virtually unrestricted.

FIGS. 3A through 3D illustrate truss plate bundles 50a, 50b, 50c, and 50d. Providing truss plates in a unitized bundle 50 facilitates handling thereof. The basic structure of the truss plates of each of the truss plate bundles 50a, 50b, 50c, 50d is the same; however, as explained further below, each of these bundles differs in thickness, material type or both. In light of the similarity of structure, only the truss plate bundle 50a will be described herein; those skilled in this art will appreciate that this discussion is equally applicable to the other truss plate bundles 50b, 50c, 50d.

The truss plate bundle 50a comprises a plurality of cooperating truss plate pairs 52 bound as a unit by a connecting band 58a. The cooperating pairs 52 are arranged in the bundle so that the backing member (exemplified at 54) of one of the truss plates comprising each pair 52 is in contacting parallel relationship with a backing member (exemplified at 55) of an adjacent cooperating pair. Those skilled in this art will appreciate that, although it is preferred that all of the truss plates forming the truss plate bundle 50a be arranged in cooperating pairs, the truss plates can be arranged so that as few as two of the truss plates are in cooperating pairs, with the remainder of the truss plates being arranged such that the impaling members of one truss plate contact the backing member of a second adjacent truss plate and the impaling members of the second truss plate extend in the same direction as that of the first truss plate. Indeed, the truss plates can even be arranged so that all of the impaling members of the truss plates extend in the same direction, although this configuration exposes the impaling members of an endmost truss plate.

In the illustrated embodiment, the truss plates comprising the truss plate bundles 50a and 50d are formed of 20 gauge steel, the truss plates comprising the truss plate bundle 50b are formed of 18 gauge steel, and the truss plates comprising the truss plate bundle 50c are formed of 16 gauge steel. The truss plates of the truss plate bundles 50a, 50b and 50c are formed of steel having a yield strength of about 33 ksi, and the truss plates of the truss plate bundle 50d are formed of high yield steel having a yield strength of about 60 ksi. Thus, the truss plates of each truss plate bundle 50a, 50b, 50c, 50d differ from the truss plates of each of the other truss plate bundles in thickness, material composition, or both.

The connecting band 58a encircles the cooperating pairs 52 lengthwise (FIG. 3A) and thereby binds them into a conveniently handled unit. Those skilled in this art will appreciate that, although the illustrated connecting band 58a is preferred, any connecting means cooperating with the truss plate pairs for effecting unitization thereof with backing members of adjacent cooperating pairs in parallel contacting relationship is suitable for use with the invention. An exemplary alternative connecting means is a wire extending through a specified aperture of each truss plate and crimped at each end to prevent the pairs from separating; another exemplary alternative connecting means is a heat-shrinkable polymer film that partially or fully encloses the cooperating pairs 52. The connecting band 58a or alternative connecting means should be configured so that the backing member perimeters of truss plates within the bundle 50 are substantially aligned. It is intended that bundles with substantially aligned backing members include those in which the backing member edges are slightly offset by approximately the thickness of an impaling member; this offset is caused by the mating of truss plates that each have a plane of mirror symmetry about in the length and width dimensions.

The connecting bands 58a, 58b, 58c, 58d on each of the truss plate bundles 50a, 50b, 50c, 50d are formed of different colors. For example, and as is preferred, the connecting band 58a on the truss plate bundle 50a can be white, the connecting band 58b on the truss plate bundle 50b can be red, the connecting band 58c on the truss plate bundle 50c can be black, and the connecting band 58d on the truss plate bundle 50d can be yellow. By interconnecting the truss plates of the truss plate bundles 50a, 50b, 50c, 50d with connecting bands 58a, 58b, 58c, 58d of different colors, the connecting bands 58a, 58b, 58c, 58d serve to identify the thickness and material composition of the truss plates comprising the bundle. Thus, an operator who requires a set of 20 gauge truss plates formed of 33 ksi steel can rapidly identify a bundle comprising such truss plates at a distance (such as across the truss construction plant) simply by locating bundles interconnected with a white connecting band 58a. Similarly, an operator requiring a set of 18 gauge truss plates formed of 40 ksi steel need only locate bundles interconnected with a red connecting band 58b. The same identification method can be used to locate 16 gauge, 33 ksi truss plates (black connecting band) and high yield steel truss plates (yellow connecting band).

Figure 4A:
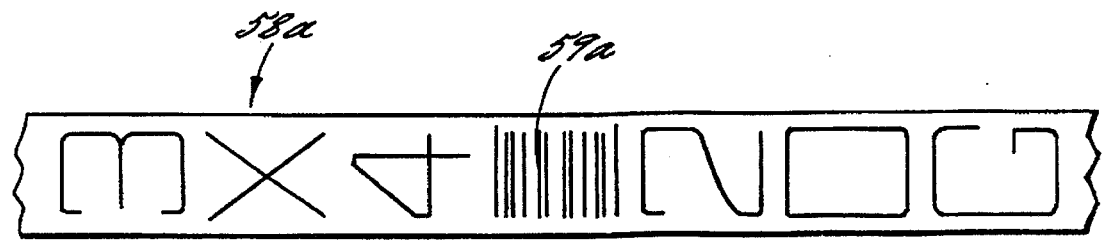
FIGS. 4A through 4D are enlarged partial top views of the truss plate bundles of FIGS. 3A through 3D showing the printed indicia and bar codes contained on the connecting bands of each.
Figure 4B:
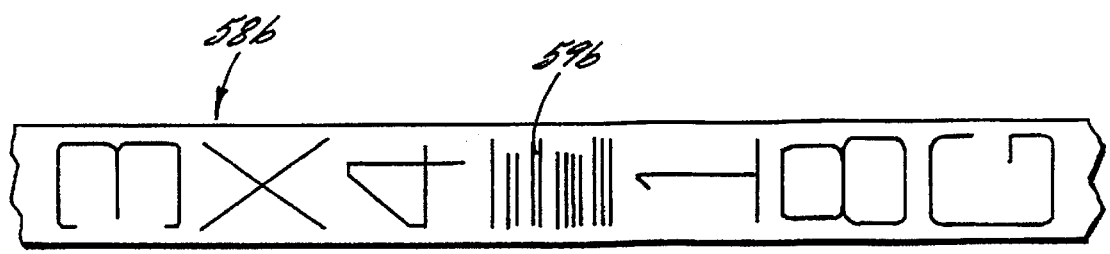
Figure 4C:
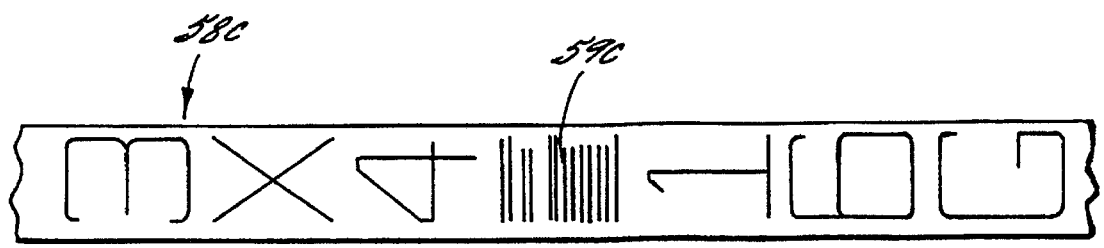
Figure 4D:
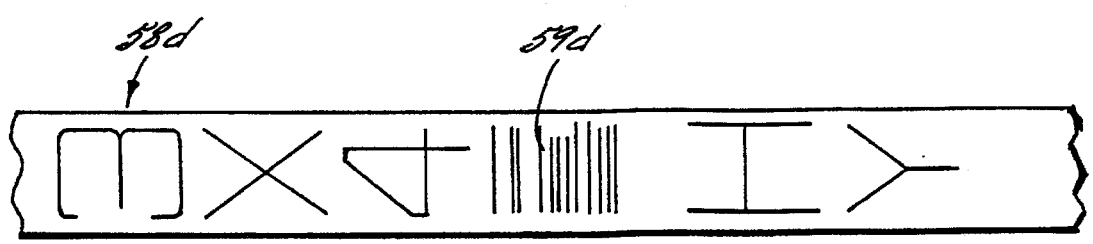

Additionally, printed indicia characterizing the truss plate can also be included on the connecting bands 58a, 58b, 58c, 58d. As indicated in FIG. 4A, the thickness (20 gauge) of the material and the size (3 inches by 4 inches) of the truss plates comprising the truss plate bundle 50a are imprinted in the connecting band 58a. Also, an optically readable encoded pattern 59a indicating the size, thickness, and material composition of the truss plates is included on the connecting band 58a. Each of the other truss plate bundles 50b, 50c, 50d similarly include indicia 59b, 59c, 59d indicating their respective size, thickness, and material composition (see FIGS. 4B through 4D).

Those skilled in this art will recognize that, although the identification method described above is preferred, any differentiation of color or other visual indicia, such as stripes, printed characters, and the like, on the connecting bands or other connecting means can be used with the present invention. For example, if the truss plates of a truss plate bundle are interconnected with heat-shrinkable polymer film, differently colored film can be used to interconnect truss plates of different thickness, or a colored sticker can be affixed to the film after it has been applied to the truss plates.

The truss plate bundles illustrated in FIGS. 3A through 3D can be formed by hand or by automated means. An exemplary automated method for forming truss plate bundles is disclosed in detail in co-assigned and co-pending U.S. patent application Ser. No. 08/364,609, the disclosure of which is hereby incorporated by reference in its entirety.

The benefit of employing truss plate bundles having visual indicia on the connecting bands can be better understood by reference to FIGS. 5 and 6, which illustrate a truss table 60 and an exemplary floor truss T being constructed thereon. The truss table 60 includes a generally horizontal support surface 61 and pair of upright rails 62 fixed thereto. The support surface 61 and the rails 62 define a cavity 63 within which the floor truss T is constructed.

During truss construction, initially a plurality of planks are arranged in a predetermined configuration exemplified by the triangulated web shown in FIG. 5. In the illustrated floor truss T, the three truss plates 66 used to interconnect the joints between longitudinal planks 64a, 64b and diagonal planks 65 positioned at one end of the floor truss T are specified by engineered design to be "high yield" truss plates. Continuing away from the end of the floor truss T, the adjacent two joints formed between diagonal planks 67 and longitudinal planks 64a, 64b, 64c are specified to be interconnected with 18 gauge truss plates 68. The remaining joints illustrated in FIGS. 4 and 5 between diagonal planks 69 and the longitudinal planks 64a, 64c are interconnected under specification by 20 gauge truss plates 70. The joint between longitudinal planks 64b, 64c is specified to be interconnected with 16 gauge truss plates 72.

Once all of the truss plates required for the truss T are in place, a pressure roller unit 80, which comprises a top roller 81 and a lower roller 82, is activated and directed to travel the length of the truss table 60 (FIG. 6). The top roller 81 and the lower roller 82 are positioned to sandwich the support surface 61, the rails 62, and the planks 64, 65, 67, 69. As the roller unit 80 travels along the length of the truss table 60, the top and lower rollers 81 and 82 press the truss plates 66, 68, 70 into the planks 64, 65, 67, 69 so that their impaling members fully penetrate the planks and so that the backing members of the truss plates 66, 68, 70 contact the plank upper surfaces, thereby permanently securing the joints between adjacent planks.

As shown in FIGS. 5 and 6, often truss construction workers stack truss plates on edge portions of the truss table support surface 61 (i.e., those portions of the truss table support surface 61 that are outside the rails 62). This stacking is performed because frequently, and particularly for floor and roof trusses, a series of identical trusses, having identical planks and identical truss plates, will be constructed sequentially. Truss plates stacked in the proper location enable this sequential construction to occur rapidly, as a constructed truss can be removed from the truss table 60, the planks for the next truss can be positioned, the truss plates can be positioned on the planks, and the pressure roller unit 80 can be rolled over the truss plates to interconnect the planks and thereby form the truss T. Accordingly, high yield truss plates 66, 18 gauge truss plates 68, 20 gauge truss plates 70, and 16 gauge truss plates 72 are stacked on the truss table support surface 61 adjacent their respective truss joints. Significant time is saved because the truss plates are stacked on the truss table support surface 61 adjacent the proper joints, and errors in construction are reduced.

Because the truss plate bundles 50a, 50b, 50c, 50d of the present invention indicate the thickness and material type of the truss plates comprising each bundle, an operator can quickly identify a bundle that contains the type of truss plates that are needed for a particular joint, even if the bundle is located a considerable distance from the table, such as across the construction floor of a truss construction plant. Thus, identifying a replacement stack of truss plates to replenish a specific location on a truss table becomes a simple task that can be performed rapidly by even an inexperienced or unskilled worker with minimal training. As a result, truss construction plants can spend considerably less time and effort in tracking truss plates with less opportunity for error.

FIG. 7 shows how a plurality of truss plate bundles of the present invention can be formed into a stack 90 that rests upon an underlying pallet 100. The stack 90 is then enclosed by a polymeric film wrapper 102 (shown in partial cutaway view in FIG. 7) that is attached to the pallet 100, although those skilled in this art will appreciate that other enclosing means, such as a cardboard carton, could be used in lieu of the wrapper 102. The stack 70 comprises a plurality of truss plate bundles 92 arranged in a plurality of vertical layers 94, 96, 98. The bundles 92 are oriented so that all of the truss plate backing members contained therein extend in an upright plane. The stack 90 can be formed manually or by automated means. An exemplary automated apparatus and method for forming the stack 90 is disclosed in detail in co-pending and co-assigned U.S. patent application Ser. No. 08/364,609. Typically the stack 90 comprises truss plate bundles that include truss plates of similar thickness and material composition, thereby rendering the bundles of stack 90 easily visually identified. However, separate stacks of dissimilar truss plate bundles can be shipped together.

The foregoing embodiments are illustrative of the present invention, and are not to be construed as limiting thereof. The invention is defined by the following claims, with equivalents of the claims to be included therein.

That which is claimed is:

1. A method of packaging truss plates, each of said truss plates comprising a generally planar backing member and a plurality of impaling members extending outwardly from one side thereof, each truss plate backing member including a plurality of elongate apertures having opposed ends and being configured so that an impaling member extends from each aperture end, said method comprising the steps of:

wrapping a first plurality of truss plates with a connecting band to create a first unitized truss plate bundle, in which the backing members of said first plurality of truss plates have a first thickness and a first material composition and are disposed generally parallel to one another and each truss plate of said first plurality of truss plates is in contacting relationship with at least one other truss plate of said first plurality of truss plates, wherein the respective backing members of said truss plates are disposed in a parallel overlying relationship with the impaling members of each truss plate extending toward the backing member of the other truss plate forming a cooperating pair, said connecting band including first visual indicia indicating that said first truss plate bundle comprises truss plates with backing members of said first thickness and said first material composition; and wrapping a second plurality of truss plates with a connecting band to create a second unitized truss plate bundle, in which the backing members of said second plurality of truss plates have a second thickness and a second material composition and are disposed generally parallel to one another and each truss plate of said second plurality of truss plates is in contacting relationship with at least one other truss plate of said second plurality of truss plates, wherein the respective backing members of said truss plates are disposed in a parallel overlying relationship with the impaling members of each truss plate extending toward the backing member of the other truss plate forming a cooperating pair, at least one of said second thickness and said second material composition being different from, respectively, said first thickness and said first material composition, said connecting band including second visual indicia indicating that said second truss plate bundle comprises truss plates with backing members having said second thickness and a second material composition, said second visual indicia differing from said first visual indicia.

2. The method defined in claim 1, further comprising the step of shipping said first truss plate bundle and said second truss plate bundle to a remote location.

3. The method defined in claim 1, wherein all of said first plurality of truss plates are formed into cooperating pairs; and wherein all of said second plurality of truss plates are formed into cooperating pairs.

4. The method defined in claim 1, wherein said first visual indicia comprises said first connecting band being of a first color, and said second visual indicia comprises said second connecting band being of a second color differing from said first color.

5. The method defined in claim 1, wherein each of said first and second connecting bands further include printed indicia of the size of said backing members of said first and second pluralities of truss plates.

6. The method defined in claim 5, wherein each of said first and second connecting bands further include identifying bar codes.

* * * * *